3,444,143
DECARBOXYLATED POLYMERIC
CARBOXYLIC ACID
Thomas A. Morris, Jr., Groton, and Bryce E. Tate, Niantic, Conn., assignors to Chas. Pfizer & Co., Inc., New York, N.Y., a corporation of Delaware
No Drawing. Filed May 10, 1966, Ser. No. 548,842
Int. Cl. C08f 27/00
U.S. Cl. 260—78.4      6 Claims

ABSTRACT OF THE DISCLOSURE

Partially decarboxylated polymers and copolymers of itaconic acid, process of producing the same and the utility thereof for the stabilization of other polymers and as coating agents.

This invention relates to new and useful polymeric compounds. More particularly, it is concerned with various novel compounds derived from certain polymeric acids and with the methods used to prepare them.

Among the polymeric acids, polyitaconic acid itself and such other closely related compounds as those described in U.S. Patent No. 3,055,873 are old in the art and have a wide variety of different uses discovered for them, but they have never been found to be of value as chelating agents. In accordance with the present invention, it has now been found possible to partially decarboxylate polyitaconic acid and other like compounds as well so as to produce new polymers having this desired property, i.e., the chelating function. This accomplishment is truly surprising when one considers that the structurally-related polyacrylic acid and polymethacrylic acid both behave quite differently under these same conditions.

In accordance with the process for preparing the new compounds of this invention, a polymeric carboxylic acid selected from the class consisting of (1) polyitaconic acid, (2) a copolymer of itaconic acid containing at least about 10 mole percent of itaconic acid and up to about 90 mole percent of an acidic comonomer having one polymerizable double bond $\alpha,\beta$- to one carboxylic acid group and a (3) copolymer of itaconic acid containing at least about 30 mole percent of itaconic acid and up to about 70 mole percent of a non-acidic comonomer having one polymerizable double bond is heated at an elevated temperature to produce carbon dioxide. Suitable starting materials for this reaction, therefore, include, in addition to polyitaconic acid itself as previously mentioned, those aforesaid copolymers of itaconic acid formed with up to about 90 mole percent of acrylic acid or methacrylic acid, for example, as well as those formed from itaconic acid with up to about 70 mole percent of styrene, acrylonitrile, methacrylonitrile, lower alkyl acrylates and lower alkyl methacrylates, and mixtures of these monomers. In general, the method involves heating the polymeric acid in an aqueous medium until evolution of carbon dioxide gas is essentially complete, so that, in practice, up to about 30 mole percent of carbon dioxide is evolved per molar equivalent of itaconic acid unit in the polymer. Although some chelating functions may be introduced into the polymer molecule below less than about 5 mole percent of evolved carbon dioxide per each itaconic acid unit in the polymer, it is generally not advisable or at least not preferable to go below this point if the desired effect is still to be achieved in a most striking manner. For instance, in the case of those copolymers formed with non-acid monomers, such as styrene, acrylonitrile and the like, there is generally evolved lesser and varying amounts of carbon dioxide per itaconic acid unit on the same basis as before. The heating necessary to effect this reaction is such that the reaction temperature is always one that is preferably kept within the range of from about 60° C. up to about 160° C. so that about approximately 5 to 30 mole percent of carbon dioxide is evolved in the above basis during said heating process. The reaction is preferably carried out in an aqueous medium under either acidic, neutral or basic reaction conditions, and if base is employed to accelerate the process, a sufficient amount is ordinarily used to only partially neutralize the aforesaid decarboxylated product, which still contains some free carboxyl groups. In any event, the upper limit of neutralization should not desirably exceed about 80%. Isolation of the desired product from the reaction mixture is then easily effected by standard means such as, for example, by the use of freeze-drying and like techniques, etc.

The decarboxylation process of this invention introduces into the starting polymer compounds chromophoric groups absorbing in the ultraviolet region of the spectrum at about 283 m$\mu$. Simultaneously, chelating functions begin to appear in the polymer as can be simply demonstrated by the appearance of a positive ferric chloride-enol test (red-purple color), which is not given by the undecarboxylated polymers. The optical density at the wave length of maximum absorption expressed as $$E^{1\%}_{1\,cm.}$$

i.e., the optical density of a 1% solution of 1 cm. thickness, is a convenient measure or barometer of the extent of decarboxylation and incorporation of chelating groups into those polymers where other ultraviolet-absorbing repeating units do not interfere. A homopolymer of itaconic acid, i.e., polyitaconic acid, which has been partially decarboxylated as far as possible under the conditions of the instant reaction process will have an $$E^{1\%}_{1\,cm.}$$

of about 45–50. Incompletely partially decarboxylated polyitaconic acid and completely or incompletely partially decarboxylated copolymers of itaconic acid with non-absorbing monomers will have $$E^{1\%}_{1\,cm.}$$

values of about between 0 and 45–50, also at about 283 m$\mu$.

The novel products produced by the process of this invention have varying practical applications depending upon the type of polymers involved in which the chelating groups are found. For instance, polymers containing 30–100% itaconic acid, after decarboxylation, are useful as the alkali metal salts in stabilizing other polymers, such as polyvinyl chloride or polypropylene, where traces of heavy metal ions like iron or copper may otherwise catalyze the decomposition of same. On the other hand, copolymers containing 5–50% itaconic acid, after decarboxylation, are useful in the preparation of coatings which are cross-linked through the chelating groups themselves by means of polyvalent metal ions. The ammonium and alkali metal salts of the partially decarboxylated polymers prepared from 15–100% itaconic acid and 0–85% of a $\alpha,\beta$-unsaturated carboxylic acid comonomer are also useful in areas where they can be used as pigment dispersing agents for latex paints.

The partially decarboxylated polyitaconic acid produced when polyitaconic acid itself is subjected to the decarboxylation process of this invention, until the production of carbon dioxide gas ceases, is a pale-yellow colored acidic organic compound capable of forming salts with a wide variety of different metal base compounds, with ammonia and with organic amines as well. It is soluble in water and slightly soluble in acetone, in addition to being stable in the dry state or when dissolved in anhydrous solvents. When dissolved in water, it exhibits a characteristic wave length of maximum absorption in the ultraviolet region of the spectrum at about 283 m$\mu$ where $$E_{1\,cm.}^{1\%} = 48.6$$

and when in 0.01 N NaOH at about 316 m$\mu$ where $$E_{1\,cm.}^{1\%} = 74.5$$

The salts which it forms with metals include those of the alkali metals such as sodium and potassium, the alkaline-earth metals such as calcium, magnesium and barium and the heavy metals such as those of iron, copper and zinc, etc. The salts which it forms with organic amines include those formed from water-soluble lower alkyl amines, like the lower alkanolamines, for example, in addition to pyridine, ethylene diamine and triethylamine, etc.

Other partially decarboxylated polyitaconic acids of this invention include those formed by partially decarboxylating copolymers of itaconic as previously discussed. For example, a product has been prepared by decarboxylating the copolymer formed from itaconic acid with acrylic acid on an equimolar basis, i.e., wherein the reactant weight ratio of the two components is 1.8:1.0, respectively. The resulting partially decarboxylated polymeric acid also exhibits a wave length of maximum absorption in the ultraviolet region of the spectrum at about 283 m$\mu$, but $$E_{1\,cm.}^{1\%}$$

is only 17 for this particular substance.

In summary, therefore, the present invention includes those partially decarboxylated copolymers and polymeric acids formed from polyitaconic acid itself; those formed from copolymers of itaconic acid containing at least about 10 mole percent of itaconic acid and up to about 90 mole percent of polymerizable double bond units derived from monomers of the structure $CH_2=CR_1R_2$, where $R_1$ is chosen from the group consisting of hydrogen and methyl and $R_2$ is carboxyl, and those formed from copolymers of itaconic acid containing at least about 30 mole percent of itaconic acid and up to about 70 mole percent of polymerizable double bond units derived from monomers of the structure $CH_2=CR_1R_2$, where $R_1$ is chosen from the group consisting of hydrogen and methyl and $R_2$ is chosen from the group consisting of carbalkoxy containing from one to four carbon atoms in the alkyl group, cyano and phenyl, with $R_1$ always being hydrogen when $R_2$ is phenyl. Moreover, it is to be understood that by the use of the term polyitaconic acid in this connection, as well as the related copolymers and polymeric acids referred to above, we mean those polymers and copolymers containing 10–100% itaconic acid which have Brookfield viscosity readings in the 10–100,000 cps. (centipoise) range at 25° C. when measured in either water or dioxane as a 25% solution.

This invention is further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

Example I

In a 2-liter, three-necked round-bottomed flask equipped with reflux condsener, mechanical stirrer and immersion thermometer, there were placed 500 g. (3.85 moles) of refined itaconic acid dissolved in 1000 ml. of water (the latter step first required heating the aqueous mixture on a steam bath). Stirring was then initiated and the temperature of the reaction mixture was adjusted to 70° C., at which point 5.4 g. (0.5 mole percent) of potassium persulfate were added. The resulting mixture was then heated at ~65° C. (via an oil bath at 70° C.) for 29 hours, at the end of which time an additional 2.7 g. (0.25 mole percent) of potassium persulfate were added and heating was continued for another 18.5 hours. At the end of this time, i.e., the 47.5-hour mark, bromine number analysis on a sample revealed that only 9.5% of the original itaconic acid starting material still remained in the mixture. A 200 g. sample of the aqueous polymer solution was then slowly poured into two liters of cold acetone and the polymer precipitated from solution in the form of fine granules. It was collected by means of suction filtration and reprecipitated twice again from aqueous acetone. The fluffy white powder so obtained was then washed with additional fresh acetone and air-dried to give a product that was thereafter further dried in a vacuum oven at 55° C. and 20 mm. Hg pressure. In this maner, there was obtained solid polyitaconic acid which after standing in a vacuum desiccator over phosphorus pentoxide for about 64 hours and then in a Fisher drying pistol at 56° C. and 0.1 mm. Hg pressure for five hours was finally dried to constant weight. This product gave no color with ferric chloride solution, was soluble in water and insoluble in acetone, and possessed the following characteristic properties:

$$\lambda_{max.}^{H_2O}\ 282\ m\mu\ (E_{1\,cm.}^{1\%}=4.7)$$

Brookfield viscosity, #2 spindle, 30 r.p.m. at 25° C., 126 centipoise (38% aqueous solution).

*Analysis.*—Calcd. for $(C_5H_6O_4)$: C, 46.2; H, 4.65. Found: C, 47.2; H, 5.15; bromine number, 1.5.

Example II

In a 100 ml. round-bottomed flask equipped with reflux condenser and gas outlet tube attached to the open end of the condsener and extending down into an inverted cylinder filled with saturated sodium chloride solution, there were placed 13 g. of polyitaconic acid (prepared as in Example I from refined itaconic acid) and 26 ml. of water. When essentially all of the polyitaconic acid had dissolved, the reaction mixture was heated gradually to reflux by means of pre-heated oil bath at 125° C. and the amount of carbon dioxide gas evolved, which collected in the cylinder, was measured at various time intervals. It was found that at the end of 47 hours, 650 ml. of carbon dioxide gas had evolved and that the reaction was essentially complete at this point. This amounted to 29% of the theoretical value for one mole of carbon dioxide per mole of each itaconic acid unit in the polymer. The half-life period for carbon dioxide evolution was about 4.5 hours.

Twenty grams of the decarboxylated polyitaconic acid solution prepared above was then diluted with 20 ml. of water and filtered thru a sintered-glass funnel after having first been briefly warmed. Part of the filtrate thus obtained (15 ml.) was then diluted further with 15 ml. of water and the resulting sample was freeze-dried. The fluffy light material which resulted weighed 1.8 g. and was thereafter further dried in a Fisher drying pistol at 54° C. and 0.1 mm. Hg. pressure for about 20 hours. The partially decarboxylated solid polyitaconic acid product gave a purple color with ferric chloride solution, was soluble in water (although less so than the original polyitaconic acid) ands slightly soluble in acetone, and possessed the following characteristic properties:

$$\lambda_{max.}^{H_2O}\ at\ 283\ m\mu\ (E_{cm.}^{1\%}=48.6);\ \lambda_{max.}^{0.01\ N\ NaOH}\ at\ 316\ m\mu\ (E_{cm.}^{1\%}=74.5).$$

*Analysis*—Found: C, 50.88; H, 5.02; bromine number, 16.3.

Example III

A solution of 33.6 g. (0.3 mole) of itaconic anhydride in 33.6 ml. of benzene containing 0.36 g. (0.5 mole percent) of benzoyl peroxide was heated in a nitrogen atmosphere at an external oil-bath temperature of 75° C. in much the same manner as that described previously in Example I for the corresponding reaction starting with itaconic acid. At the end of 96 hours, heating was discontinued and the polymer which had precipitated from the hot solution was collected on a filter funnel by means of suction filtration and partially air-dried thereon. After washing with warm benzene, it was subsequently dissolved in 100 ml. of dry acetone and the latter solution was then poured slowly into one liter of chloroform with vigorous agitation. The precipitated polymer was again collected on a filter, partially air-dried as before and then dried in a vacuum oven with no heat. A one-third portion of this latter sample was then reprecipitated from 440 ml. of dry acetone-chloroform (1:10 by volume), and the resultant sample was finally dried to constant weight in vacuo over phosphorus pentoxide and then in a Fisher drying pistol at 54° C. and 0.1 mm. Hg pressure for about five hours. In this manner, there were obtained 28 g. (83%) of solid polytaconic anhydride essentially free of all remaining traces of monomer.

*Analysis*—Calcd. for $(C_5H_4O_3)n$: C, 53.56; H, 3.59. Found: C, 53.11; H, 4.14.

Example IV

A solution of 11.2 g. (0.1 mole) of polyitaconic anhydride in 28 ml. of water was decarboxylated in a manner similar to that described in Example II. It took about twenty minutes for all the anhydride to first dissolve, but thereafter the procedure was the same as that described before. At the end of 96 hours, the heating process was discontinued and the precipitated polymer was collected. The product obtained in this manner was then dissolved in water to make a 5% solution, filtered while hot thru a sintered-glass funnel and freeze-dried to afford 6.5 g. of partially decarboxylated solid polyitaconic acid in the form of fluffy crystalline particles. A sample was then further dried to constant weight in a Fisher drying pistol at 54° C. and 0.1 mm. Hg pressure for 24 hours and analyzed as follows:

*Analysis*—Found: C, 50.90; H, 5.05; bromide number, 23.90.

Example V

The results of a series of experiments designed to show the effect of acid and base on the decarboxylation procedure are set forth below. In each instance, there was added either 0.02 mole (as itaconic units) of polyitaconic acid or 0.02 mole of polyitaconic anhydride, as the case may be, to 18 ml. of aqueous solvent at 100° C. contained in a stirred flask equipped with mechanical stirrer and attached via a reflux condenser to a gas buret. The flask and its contents were quickly sealed and the rate and amount of carbon dioxide gas evolution was then measured, with the results being reported as follows (Evolution of carbon dioxide is expressed in terms of moles per molar equivalent of itaconic acid unit in the polymer):

| Solid Polymer | Aqueous Solvent | t. ½ (hr.) | Amt. CO₂ |
|---|---|---|---|
| Polyitaconic Acid | Water, distilled | 1.30 | 0.26 |
| Do | NaOH, 0.25 mole [1] | 0.30 | |
| Polyitaconic Anhydride | Water, distilled | 1.50 | 0.30 |
| Do | 6N Hydrochloric | [2] 2.0-3.0 | 0.26 |
| Do | NaOH, 0.5 mole [1] | 0.025 | 0.29 |

[1] This is based on each mole of itaconic acid unit.
[2] Heated from room temperature to reflux temperature of 108° C. Thermal expansion superimposed on gas evolution made half-life only approximate.

It can be seen from data presented in the above table that limited amounts of base greatly increase the decarboxylation rate without affecting the final extent of reaction. Polyitaconic acid when added to dilute aqueous potassium hydroxide, containing two moles of potassium hydroxide per mole of itaconic acid unit in the polymer, did not decarboxylate at 58° C. in 24 hours, evidenced by ultraviolet absorption measurement of the acidified solution at 279 mµ. Partial neutralization of the base with concentrated sulfuric acid caused decarboxylation to proceed. Addition of polyitaconic anhydride, on the other hand, to the same amount of base caused essentially complete partial decarboxylation to occur in the one-minute period required to mix and withdraw a sample for assay by ultraviolet absorption.

Example VI

In a four-necked, 5-liter round-bottomed flask equipped with reflux condenser, thermometer, mechanical stirrer and nitrogen-inlet tube, there were placed 910 g. (7.0 moles) of refined itaconic acid dissolved in 2828 ml. of deionized water. The stirrer was then started, heat was applied by means of an oil bath and 504 g. (7.0 moles) of acrylic acid were added to the mixture. The internal temperature was brought to a value in the neighborhood of 50 ± 2° C., while a flow stream of nitrogen gas was slowly introduced into the heated system. Upon equilibration, 18.92 g. (0.07 mole) of potassium persulfate were added and the reaction course was thereafter followed by means of bromine number analysis. At the end of 31 hours and 15 minutes, an additional amount (9.46 g., 0.035 mole) of potassium persulfate was added. The reaction was then continued until a total time of 49 hours and 15 minutes had elapsed (bromine number analysis at the 46 hour and 35 minute mark had indicated a 97% completion of reaction). The itaconic acid-acrylic acid copolymer so produced exhibited the following characteristic physical properties in aqueous solution: Brookfield viscosity, No. 2 spindle, 30 r.p.m. at 25° C., 970 centipoise (cps.); specific gravity at 15°/15° C., 1.154;

$$n_{sp}^{20}/C_{1\%}, 0.64; n_{sp}^{20}/C_{0.33\%}, 0.89$$

The solid polymer can be recovered from the aqueous solution by precipitation with acetone as described in Example I for polyitaconic acid.

Example VII

The procedure described in Example II was essentially followed to partially decarboxylate the copolymer of itaconic acid with acrylic acid prepared as described in the preceding example (1.8 parts itaconic to 1.0 part acrylic by weight) except that 2.0 g. of the copolymer and 18 ml. of water were employed. At the end of approximately 25 hours, the decarboxylation reaction step was essentially complete (59 ml. of evolved carbon dioxide gas had been collected), and there was obtained a partially decarboxylated solid copolymer product having a wave length of maximum absorption in the ultraviolet region of the spectrum at 283 mµ where $$E_{1\,cm.}^{1\%} = 17$$

The amount of gas evolved amounted to 26 mole percent of cargon dioxide per molar equivalent of itaconic acid unit in the polymer.

Example VIII

In a four-necked, 5-liter round-bottomed flask equipped with reflux condenser, thermometer, mechanical stirrer and nitrogen-inlet tube, there were placed 700 g. (5.38 moles) of refined itaconic acid dissolved in 2800 ml. of deionized water. The mechanical stirrer was started and the flask and its contents were heated by means of an oil bath, while 700 g. (9.71 moles) of acrcylic acid were added. The reaction mixture was then brought to a temperature of 50±2° C., with nitrogen flushing, during the course of a one-hour period, at which point the catalyst, consisting of 20.4 g. (0.0755 mole) of potassium persulfate, was added all at once. A very slow stream of nitrogen gas was then introduced in the system and the reaction was followed by means of bromine number analysis in the usual manner. At the end of 28 hours and 25 minutes, the reaction was found to be 98% complete with respect to copolymer formation and at the end of 31 hours and ten minutes, heating was discontinued. The aqueous solution of the itaconic-acrylic acid copolymer so obtained (1:1 reactant weight ratio) exhibited the following characteristic physical properties: Brookfield viscosity, No. 3 spindle, 30 r.p.m. at 25° C., 3720 cps.; specific gravity, 15/15° C., 1.146;

$n_{sp.}^{20}/C_{1\%}$, 1.15; $n_{sp.}^{20}/C_{0.33\%}$, 1.81

Example IX

The procedure described in Example II was essentially followed to partially decarboxylate the solid copolymer of the preceding example (1.0 part itaconic to 1.0 part acrylic by weight) except that 1.85 g. of the copolymer and 18 ml. of water were employed. At the end of approximately 28 hours, the decarboxylation reaction was essentially complete (39 ml. of evolved carbon dioxide had been collected at this point). There was obtained a partially decarboxylated solid copolymer product having a wave length of maximum absorption in the ultraviolet region of the spectrum at 282 mμ where $E_{1\,cm.}^{1\%} = 6.9$ The amount of gas evolved amounted to 24 mole percent of carbon dioxide per molar equivalent of itaconic acid monomer unit in the polymer.

Example X

A solution consisting of 6.35 g. of partially decarboxylated solid polyitaconic acid dissolved in 40 ml. of water was prepared. The pH of this solution was measured and found to be 1.7. An identical solution was then prepared and brought to a pH of 9.0 with 1.5 ml. of 50% aqueous potassium hydroxide. Both solutions were then made up to 100 g. with water (to give a 5% solution in each case) and subjected to a series of tests with various aqueous metal salt solutions. The results obtained in this manner are summarized below in the following table, where the figures presented indicate the amount in milliliters (ml.) of 2.5% aqueous metal salt solution required to cause precipitation in 2 ml. of each of the two 5% aqueous polymer solutions. A corresponding set of values obtained with 5% aqueous polyitaconic acid is also presented for comparison purposes.

| Metal Cation | Decarboxylated Polymer | | Polyitaconic Acid | |
|---|---|---|---|---|
| | pH 1.7 | pH 9.0 | pH 1.0 | pH 9.0 |
| Magnesium | 0.10 | 0.25 | No ppt | 0.05 |
| Calcium | 0.07 | 0.05 | No ppt | ¹0.40 |
| Barium | 0.25 | No. ppt | 0.05 | ¹1.90 |
| Ferric | 0.05 | 0.05 | No ppt | 0.05 |
| Ferrous | 0.05 | ¹0.75 | No ppt | ¹0.65 |
| Copper | 0.05 | ¹0.10 | No ppt | 0.05 |
| Zinc | ¹0.20 | ¹0.20 | No ppt | ¹0.50 |

¹ Immediate precipitate produced at 0.05 ml., but it was not sustaining

Example XI

In a 2000 ml. four-necked, round-bottomed flask equipped with reflux condenser, mechanical stirrer, nitrogen-inlet tube and thermometer, there were placed 450 g. (3.46 moles) of refined itaconic acid in 1200 ml. of deionized water. Stirring was then commenced as was nitrogen flushing of the system, while heating brought the mixture to 60° C., at which point complete solution occurred and 150 g. (1.74 moles) of methacrylic acid were added to the mixture. After equilibrating the final reaction mixture to 50±1° C. 7.1 g. (0.026 mole) of potassium persulfate were added to the stirred, heated system, which was thereafter analyzed by means of bromine number analysis in the usual manner at various time intervals. At the end of 24 hours, it was found that the reaction was 64% complete. After adding an additional 3.6 g. (0.013 mole) of potassium persulfate to the mixture and heating same to 60±1° C. for another 24 hours, it was found that the reaction was 88.2% complete. The solid itaconic-methacrylic acid copolymer of 3:1 reactant weight ratio so obtained possessed the following characteristic viscosity reading after dilution to a 14% aqueous solution based on the initial monomer weight: Brookfield viscosity, No. 1 spindle, 30 r.p.m. at 25° C., 57 cps.

Example XII

The procedure described in Example II for polyitaconic acid is essentially followed here to partially decarboxylate the solid copolymer prepared in the preceding example (3.0 part by weight itaconic to 1.0 part by weight methacrylic). Upon completion of this reaction, the corresponding partially decarboxylated copolymer material is the product which is obtained.

Example XIII

In a 500 ml. single-neck side arm, round-bottomed flask equipped with a reflux condenser, thermometer and drying tube, there were placed 47.0 g. (0.419 mole) of newly recrystallized itaconic anhydride (M.P. 64.5–67° C.), followed by 200 ml. of purified dioxane and 43.6 g. (0.419 mole) of freshly distilled styrene. The flask and its contents were then placed in a constant temperature oil bath at 60° C. and occasionally swirled until the temperature of the reaction mixture reached 60° C. (this required about 20 minutes). At this point, 1.02 g. (0.00419 mole) of recrystallized benzoyl peroxide was added to the mixture. The flask was then swirled every five minutes for one hour. At the 1 hr. and 4-minute mark, the reaction mixture was removed from the bath and slowly poured into one liter of freshly dried benzene with the aid of magnetical stirring. The stirring was continued for one-half hour thereafter at which point, the precipitated solids were collected on a Buchner funnel under a nitrogen atmosphere and then quickly transferred to a crystal dish placed in vacuum desiccator. After drying for 40 hours in vacuo over $P_2O_5$ at room temperature, the solid product weighed 20.7 g. This represented a 22.8% conversion to polymer for the itaconic anhydride-styrene system of equimolar reactant weight ratio. An analytical sample was then prepared by drying a small aliquot of this product in a Fisher drying pistol at 60° C. under reduced pressure for about 16 hours.

*Analysis.*—Calcd. for 50 mole percent; C, 72.3; H, 5.6. Found: C, 69.87; H, 5.33.

This corresponds on the basis of both carbon and hydrogen analyses to 55.8 mole percent itaconic anhydride.

Example XIV

The procedure described in Example II was essentially repeated to partially decarboxylate the itaconic-styrene copolymer of the preceding example except that 2.16 g. of the latter copolymer were used as starting material together with 15.6 ml. of deionized water and 2.4 ml. of 1.0309 N potassium hydroxide solution. At the end of approximately seven hours, the decarboxylation step was essentially complete (24.5 ml. of evolved carbon dioxide gas had been collected), and it was found that a partially decarboxylated solid copolymer product had been obtained. The amount of carbon dioxide gas evolved in this case represented 9.9 mole percent of carbon dioxide per molar equivalent of itaconic anhydride unit in this polymer.

Example XV

A solution is prepared consisting of 6.35 g. of partially decarboxylated solid polyitaconic acid dissolved in 40 ml. of water. The pH of this solution is then adjusted to pH 9.0 with 1.5 ml. of 50% aqueous potassium hydroxide. Upon evaporation to dryness, there is obtained the solid potassium salt of partially decarboxylated polyitaconic acid.

In like manner, the corresponding sodium and ammonium salts of this acid are obtained by merely substituting the proper amount of either sodium or ammonium hydroxide, as the case may be, in place of potassium hydroxide in the above procedure.

Example XVI

The procedure described in the preceding example is essentially followed to prepare the monoethanolammonium salt of partially decarboxylated solid polyitaconic acid by merely substituting the proper amount of monoethanolamine in place of ammonium hydroxide. Upon completion of the reaction, the desired salt is recovered from the aqueous solution by evaporating same to dryness while under reduced pressure.

In like manner, other organic amine salts of this particular acid are prepared by merely substituting the appropriate amine compound in place of monoethanolamine in accordance with this very same reaction procedure. Among the salts which have been specifically prepared in this manner are those which partially decarboxylated polyitaconic acid forms with diethanolamine, triethanolamine, ethylene diamine, diethylamine, triethylamine and with pyridine, respectively.

Example XVII

The procedure described in Example II to partially decarboxylate polyitaconic acid is esesentially followed here except that water is dispensed with as a solvent for the reaction. Instead, a film of the solid polymer is placed on a substrate and heated as before, only now the temperature of reaction somewhat exceeds 100° C. At any rate, carbon dioxide gas is again evolved and solid partially decarboxylated polyitaconic acid is the product once again obtained.

What is claimed is:

1. The product produced by the process of heating a polymeric carboxylic acid selected from the group consisting of (1) polyitaconic acid, (2) a copolymer of itaconic acid containing at least 10 mole percent of itaconic acid and up to about 90 mole percent of an acidic comonomer having one polymerizable double bond $\alpha,\beta$- to one carboxylic acid group and a (3) copolymer of itaconic acid containing 30 mole percent of itaconic acid and up to about 70 mole percent of a non-acidic comonomer having one polymerizable double bond in an aqueous medium at an elevated temperature until approximately 5 to 30 mole percent of carbon dioxide is evolved per mole equivalent of itaconic acid unit in the polymer.

2. The product produced as in claim 1 wherein the comonomer is acrylic acid.

3. The product produced as in claim 1 wherein the comonomer is methacrylic acid.

4. The product produced as in claim 1 wherein the comonomer is styrene.

5. The product produced as in claim 1 wherein the polymeric carboxylic acid is polyitaconic acid.

6. An alkali metal salt of the acidic substance claimed in claim 9.

References Cited

UNITED STATES PATENTS 3,055,873  9/1962  Hull et al. _____ 260—78.5

FOREIGN PATENTS 1,024,238  7/1958  Germany.

OTHER REFERENCES

Royals, L. L.: Advanced Organic Chemistry, Prentice-Hall (1959), p. 107.

JOSEPH L. SCHOFER, *Primary Examiner.*

C. A. HENDERSON, JR., *Assistant Examiner.*

U.S. Cl. X.R.

117—161; 260—29.6, 78.5, 2.2, 45.85

PO-1050
(5/69)

UNITED STATES PATENT OFFICE
CERTIFICATE OF CORRECTION

Patent No. 3,444,143            Dated May 13, 1969

Inventor(s) Thomas A. Morris, Jr. and Bryce E. Tate

It is certified that error appears in the above-identified patent and that said Letters Patent are hereby corrected as shown below:

Column 10, line 18, "9" should read -- 5 --.

SIGNED AND
SEALED
OCT 21 1969

(SEAL)
Attest:

Edward M. Fletcher, Jr.
Attesting Officer

WILLIAM E. SCHUYLER, JR.
Commissioner of Patents